April 22, 1958     A. ELMENDORF     2,831,794
PROCESS FOR MANUFACTURING VENEER PANELS
Filed Oct. 5, 1955
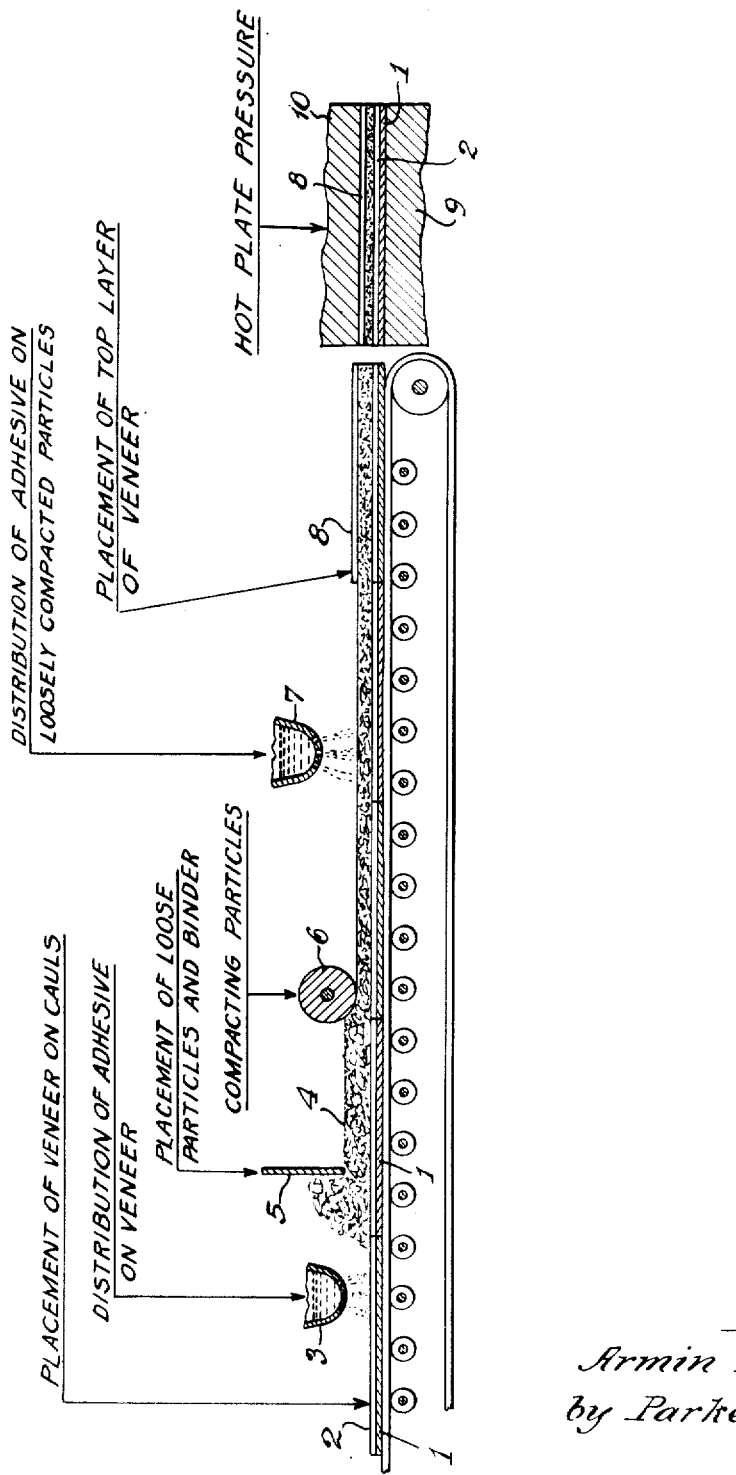
Inventor
Armin Elmendorf
by Parker & Carter
Attorneys

United States Patent Office 2,831,794
Patented Apr. 22, 1958

2,831,794

PROCESS FOR MANUFACTURING VENEER PANELS

Armin Elmendorf, Winnetka, Ill.

Application October 5, 1955, Serial No. 538,661

11 Claims. (Cl. 154—132)

The present application is a continuation in part of my previously filed application, Serial No. 366,968, filed on July 9, 1953, for Process for Manufacturing Veneer Panels, now abandoned.

A primary object of the present invention is to provide an improved process for manufacturing veneer or veneer type panels. Its aim is the production of an improved panel having a veneer face or faces and a core consisting of fine wood particles. The resultant panel has substantially the same physical properties as plywood and serves the same purposes as plywood. It solves some of the problems incident to the use of very thin veneers on the faces of a fibrous wood particle core such as checking and discoloration of the veneers. Checking is a particularly serious problem when thin, green veneers are bonded to a relatively low density core, that is, a core having a density of about 0.3 to 0.5. When green veneers are bonded by conventional procedures to fibrous wood particle cores other difficulties also arise. Among these is the frequent formation of steam pockets under the veneer or in the core, that result in blisters or explosions when the pressure is released. The problem, therefore, has several aspects, including:

(a) The prevention of veneer checking when thin, green veneers, that is, veneers having a moisture content over 25% and a thickness of $\frac{1}{30}$ of an inch to $\frac{1}{100}$ of an inch, are bonded to a core made of fibrous, ligno-cellulose particles;

(b) The prevention of explosions when green veneers are bonded to a ligno-cellulose, fibrous core, simultaneously with the bonding of the core particles to each other; and (c) The prevention of veneer discoloration.

My experience, as well as that of others, in the manufacture of veneered panels, having a core of wood chips, even when these are mostly fine, has shown that another objectionable result of applying veneer to such cores is the telegraphing through the veneers of the coarser particles. When conventional finishes are applied to such panels, many of the core particles can be detected through light reflection from the veneer surface. This is particularly true when thin, green veneers are glued to such a core in a hot plate press. Using wood particles, of which at least 50% will pass through a 20-mesh screen, and rejecting all the particles retained on a 10-mesh screen, solves this problem when the particles are bonded together simultaneously with the bonding of the veneer to the particle core.

I have found by extensive experimentation in the manufacture of large panels that the problem listed under (a) above is solved by producing a dense zone similar to the cross-banding zone of a conventional 5-ply panel under the face veneers, that is, a zone that is harder and stronger than the center of the bore, by bonding the particles to each other and bonding the face veneer to the core without removing pressure. I achieve this result by introducing an adhesive in an amount in excess of that required for normal bonding of face veneers to a fibrous core. This excess adhesive I apply to face veneers and then assemble a sandwich, which consists of two green face veneers and the core particles, with their binder, between the veneers. I then subject the assembly or sandwich thus formed to heat and pressure, and thereby force some of the adhesive into the spaces between the particles of the core near the surface, while the core is being compacted. Thus, I employ the adhesive not merely to bond the face veneers to the fibrous core, but to form a dense surface zone in the fibrous core which corresponds to cross-banding veneer of conventional plywood manufacture, and while bonding the face veneers to the dense or surface zone of the core, and bonding the particles of the core to each other. I find that this result can best be achieved with a powdered adhesive. Whereas good bonding can be obtained with a urea glue line of about 10 to 15 pounds of adhesive (dry basis), when bonding thin veneers to a fibrous core, about 15 pounds to 30 pounds per 1,000 square feet should be used to obtain the cross-banding effect. I have found that powdered adhesives in the amounts stated, when applied to green veneer, do not fall off when the veneers are turned over. Powdered adhesives, with or without the use of fillers or extenders in the adhesive, such as wheat flour, reduce tendency for the adhesive to strike or pass through the green veneer.

Discoloration of the veneer, I find, takes place with almost all species of veneer when high pressures are used in combination with high moisture contents, either in the veneer or in the core, or in both. By high pressures I mean pressures in excess of about 100 p. s. i. However, both high moisture content and high pressure result in the best bonding of particles to each other, so that the conditions which produce the best results in several respects produce the poorest results in other respects. The solution of these problems in their entirety has required thousands of tests.

By using thin, green veneers, that is, veneers from $\frac{1}{100}$ to $\frac{1}{30}$ of an inch thick, I achieve the best results with extended powdered synthetic resin adhesives, such as powdered urea-formaldehyde adhesives or powdered melamine adhesives. In my preferred pressing cycle, the following steps are taken. Low pressures, of the order of from 20 p. s. i. to 100 p. s. i. are maintained until the following results are obtained: (a) the veneer is dried, (b) the powdered adhesive is plasticized, (c) much of the adhesive is forced between the core particles near the core surface. Then high pressures, in excess of 100 p. s. i. are applied, in a range of the order of from 100 p. s. i. to 300 p. s. i. This higher pressure achieves the following results: (d) compacting the fibers of the core, (e) bonding the fibers together, and (f) bonding the veneer to the core. The low pressure may be maintained for a period of the order of from 15 to 60 seconds, and the high pressure may be maintained for a period of the order of from one to twelve minutes, depending on the thickness of the panel. When using urea adhesives and urea binders on the particles, a temperature of 250° to 300° F. is satisfactory, whereas temperatures in the range of 300° to 350° F. are used when the particles are bonded with phenolic resins, and melamine adhesives are used for bonding the veneer.

I find, also, that in order to obtain good particle bonding without the formation of steam pockets within the core, most of the moisture required should come from the green face veneers. For example, in making a panel $\frac{1}{4}$ of an inch thick, with $\frac{1}{64}$ of an inch face veneers, the veneers should be green, with a moisture content generally in the range of from 50% to 100%, while the moisture of the core is only from 5% to 12%. When this is done, some of the veneer moisture is first driven into the core, thereby facilitating the bonding of the particles. Thereafter, under certain conditions, much of it again leaves the core, while the pressure is maintained, by escaping between the face veneer and the hot press plates. During the low pressure period some moisture also escapes laterally through the core to the edges of the panel. I have found that if the temperature of the press is above that normally required for setting the adhesive, and the pressure of the hot plates on the veneer, during part of the pressing cycle, is below the pressure of saturated steam at that temperature, steam will escape between the veneer and the hot press plate. Under these conditions, steam pockets containing high pressure steam are not formed in the board, and the problem of explosions upon the release of pressure is solved. If these pressing conditions are not observed, the steam generated by the moisture in the veneer invariably causes explosions when thin panels are pressed. Such explosions are less frequent when thick panels, such as ¾ of an inch panels, are pressed, apparently due to the greater steam absorbing capacity of the core of the thick panels.

For best bonding of the particles to each other, the plate pressure should exceed about 100 p. s. i. when using phenolic resin binders. I therefore use a press temperature of about 300° F. to 350° F., to get a high saturated steam pressure, and a plate pressure below the saturated steam pressure during part of the pressing cycle. For example, as an illustration if such low pressures are used in this temperature range, in making a panel ¼ of an inch thick, with 1/64 of an inch green veneer faces, and the low plate pressure is maintained at about 50 p. s. i. for 15 to 60 seconds to dry the veneer and to force some of the resin between the particles near the veneer, and the pressure is then increased to 200 to 300 p. s. i. for 2 to 5 minutes, to compact and bind the particles, good results are obtained. At such pressures there is also some compression of the veneer. Thereby the discoloration incident to the use of high pressures and high moisture contents is eliminated, and the natural color of the veneers is maintained, and no checking of the veneers takes place. The press may then be opened quickly or slowly without causing blistering or explosions.

In order to constrain the veneer adequately to prevent veneer shrinkage checks during drying in the press, when thin green veneers are used, I find that the pressure should be kept from falling below about 20 p. s. i. The plate pressure during the initial period during which the moisture is driven out of the veneer should therefore be below 100 p. s. i., but, preferably, above about 20 p. s. i. During the particle bonding period the plate pressure should be above 100 p. s. i.

When using urea resin binders, I prefer the conventional 5% to 10% of resin in the core, based upon the weight of the fibrous particles. When using phenolic resins the resin content may be reduced to 3% to 6% for satisfactory results. The binder may be introduced as a fine spray of liquid adhesive, or the particles may be coated by other conventional means, as by precipitating a resin on the particles or fibers when supported in an aqueous solution, and subsequently drying the particles as in a flash drier to the desired moisture content. I prefer a core density of the order of 0.5 to 1.0.

Experience in the conventional manufacture of resin-particle boards with dry powdered resin binders and without face veneers has shown that the moisture of the wood particles should preferably be relatively high in order to get good bonding of the particles. For that reason, the particle moisture used is generally about 12% to 18%. I have found that when green veneers are used, such high core moisture contents result in explosions, and that much lower moisture contents in the core material may be used successfully. Core moistures of only 5% result in excellent panels in my process when green face veneers are used, but in very poor particle bonding in conventional particle board manufacture.

I wish to emphasize that, whereas I have described an operative method, I do not wish to be limited, except as below set out in the claims, to any specific materials, or sequence of steps, or to any particular mechanism for carrying out the method. For example, in the sequence of pressures, the high pressure may be used first, followed by low pressure to permit drying, and the escape of steam, although, from the point of view of veneer staining, this is not the best sequence. I therefore prefer the use of a short period of low pressure, followed by high pressure.

The sequence of steps may be widely varied. It may, for example, include (a) placing a layer of green veneer on a caul; (b) applying to its surface layer of adhesive in excess of that required for bonding the veneer to the core; (c) placing upon the veneer and adhesive the mass of core particles, with their binder, and pre-compacting the core mass, before or after placing it on the veneer, without binding the particles to each other; (d) distributing over the exposed surface of the compacted core a layer of adhesive in excess of that required for bonding the veneer to the core, and (e) applying the top layer of green veneer and then applying heat and plate pressure to the sandwich so formed.

I illustrate diagrammatically, in the attached figure, a typical sequence of mechanical operations for carrying out the above-mentioned steps. A sequence of cauls 1 are suitably conveyed through a series of operating zones. The initial step, shown at the left of the figure, is to place on a caul a layer of veneer. Such a layer is indicated at 2. After it is positioned on the caul I distribute an adhesive on the veneer. It may, for example, be a vibrated sieve or screen, diagrammatically indicated at 3, which may be used to dust the adhesive on the green veneer. Thereafter, I place the loose particles of the core, with any suitable binder, upon the layer of adhesive. Such a mass is indicated at 4, and may be evened up by a vibrating bar or knife 5. Thereafter, the particles may be compacted without bonding them. I illustrate, diagrammatically, in the figure, a roller 6, but it will be understood that momentary plate pressure may be employed. After the comminuted ligno-cellulose fibrous particles have been compacted, without binding them, I distribute an adhesive over the loosely compacted particles. Any suitable jigged or vibrated sieve or screen may be employed, as shown at 7 in the diagrammatic figure. Thereafter, I place a top player 8 of veneer, or a suitable veneer substitute, upon the layer of adhesive. Then I subject the sandwich thus formed to hot plate pressure. I illustrate, diagrammatically, a press having a lower member 9 and an upper member 10.

Whereas the above diagrammatic showing indicates a practical sequence of steps and of mechanisms for carrying them out, it will be understood that a variety of mechanisms may be employed.

In one example of present actual practice, a powdered adhesive is dusted on a thin green veneer, before the veneer is put on a caul. Thus if the veneer contains open defects, such as knot holes, the adhesive will fall through the holes, and will not collect on or be deposited on the caul. The veneer is now placed on the caul, with the dry adhesive on the top surface of the veneer.

The resin coated core particles are air-felted on a moving belt, to a uniform thickness. The belt carries the loose mat so formed to a pre-press. Upon leaving the pre-press the mat is cut to length. The pre-pressed mat is then lifted by suction and placed on the adhesive coat or layer on the veneer on the caul. The caul, with the veneer and the mat, then moves to the next station, where it receives the top layer of green veneer, with its adhesive.

The adhesive on the top layer of veneer is dusted on as a dry powder, after which the veneer is turned over mechanically and placed on the mat with its adhesive coated side down. I have found that the adhesive does not fall off when the veneer is turned over.

The completely assembled sandwich so formed, and the caul which carries it, is then inserted in a hot plate multiple opening press, where it is subjected to the above described pressing cycle.

In considering the characteristics and advantages of the above-described method, I wish to emphasize that I am able, by my process, to produce an improved veneer panel in which, by a single application of heat and pressure, the fibrous particles of a ligno-cellulose core are compacted and are bound to layers of veneer, with the surface layer particles of the core being more firmly bound to each other than the normal binding action of the binder employed with the fibrous particles. Thus the core is formed with a harder surface layer.

It should also be kept in mind that, by my method, the material of the core serves to fill knot holes or open flaws in the layers of veneer. When the veneer layers have open flaws or knotholes, the ligno-cellulose particles flow into and fill the flaws. When heat and pressure are applied, the result is the formation of a panel, with the surface layer of the particles filling whatever flaws or holes would otherwise be present in the veneer. No such filling of open defects takes place when defective veneers are bonded to the surface of previously made fibrous hard boards.

If only one layer of veneer has open defects, I prefer to place this sheet on top of the loosely compacted core, as I have found that in doing so I can more easily avoid the lodgment of particles between the veneer and the caul. Thus, when hot pressure is applied, the core bulges up and fills the flaws of the veneer or veneer substitute, and the particles are bonded together in this position. No particles are present between the veneer and the caul during the application of hot plate pressure.

I wish the term "powdered adhesive" to be interpreted to cover any dry, fragmented adhesive.

When making panels with a high density core of from 0.7 to 1.0 density, I prefer to use wood particles in the form of fibers produced by grinding wood chips in a machine such as a Bauer grinder. When low density cores are desired, for example of 0.5 to 0.7, I prefer to use strands or wood shavings, in which the wood particle has two flat surfaces.

When making boards or panels having a low density, I prefer the use of metal stops placed between the press openings. These stops determine the panel thickness, and consequently the density.

I may use a wide variety of woods for my core material. In fact, almost any species may be employed. When making a low density panel I prefer the use, for the core material, of such low density woods as cedar, aspen, cottonwood, redwood, and other low density soft woods. For the face veneers I much prefer the use of hardwoods of the angiosperm species such as birch, elm, ash, maple, gum, and oak. I have found that, apparently due to the presence of open pores in hardwood veneers, I obtain superior ventilation or steam escape with such veneers, which is important in preventing blistering and checking.

I claim:

1. The method of making a veneer panel with a fibrous ligno-cellulose core and a wood veneer surface, with includes providing a metal support, positioning on this support a layer of green wood veneer of an angiosperm variety and of a thickness within the general range of $\frac{1}{30}$ to $\frac{1}{100}$ inch, the veneer being coated with an adhesive of a thermosetting type adapted to flow when initially heated, placing ligno-cellulose particles coated with a binder on the adhesive, the particles in contact with the veneer being of a size smaller than 10 mesh and at least 50% of these particles being of a size such as to pass through a 20 mesh screen, and subjecting this assembly to pressure and a temperature sufficient to dry the veneer and generate steam from the moisture in the veneer, the pressure being at least 20 pounds per square inch but less than 100 pounds per square inch for part of the pressing cycle, and thereby forcing moisture from the veneer and between the particles while allowing steam to escape laterally from the particles and from the veneer.

2. The method of making a veneer panel with a fibrous ligno-cellulose core and a wood veneer surface, which includes providing a metal support, positioning on this support a layer of an angiosperm green veneer of a thickness within the general range of $\frac{1}{30}$ to $\frac{1}{100}$ of an inch, said green veneer having thereon a layer of powdered adhesive of a thermosetting type adapted to flow when initially heated, said adhesive being on the surface of the veneer removed from the metal support, placing on the veneer, in contact with said adhesive, a mass of ligno-cellulose fibrous particles coated with a binder, the particles in contact with the veneer being of a size smaller than 10 mesh and at least 50% of such particles of a size such as to pass a 20 mesh screen, subjecting the above described sandwich to continuous hot plate pressure in the range of 20 pounds per square inch to 300 pounds per square inch and at a temperature sufficient to convert moisture in the veneer to steam and to set the adhesive and thereby: (a) drying the veneer, (b) plasticizing the adhesive, (c) forcing adhesive between the core particles near the core surface, (d) compacting the fibers of the core, (e) bonding the fibers together, and (f) bonding the veneer to the core.

3. The method of claim 2, in which the adhesive is applied to the layer of green veneer prior to putting such veneer on the caul.

4. The method of claim 2, in which the mass of ligno-cellulose particles is pre-compressed into a core mat before it is placed on the green veneer.

5. The method of claim 2, in which veneer with open defects is used, and in which the core material is squeezed into such defects.

6. The method of claim 2, in which the moisture content of the core particles, when the sandwich enters the press, is within a range of the order of 5% to 12%.

7. The method of making a veneer panel with a fibrous ligno-cellulose core and a wood veneer surface, which includes providing a metal support, positioning on this support a layer of green veneer of an angiosperm variety and of a thickness within the general range of $\frac{1}{30}$ to $\frac{1}{100}$ of an inch, said green veneer having thereon a layer of powdered adhesive on the face removed from the metal support, said adhesive being of a type adapted to flow when initially heated, placing on the veneer, in contact with said adhesive, a mass of ligno-cellulose fibrous particles coated with a binder, the particles in contact with the veneer being of a size smaller than 10 mesh and at least 50% of such particles of a size such as to pass a 20 mesh screen, subjecting the above described sandwich initially to a hot plate pressure in the range of 20 pounds per square inch to 100 pounds per square inch and at a temperature sufficient to convert moisture in the veneer to steam and thereby: (a) drying the veneer, (b) plasticizing the adhesive, and (c) forcing adhesive between the core particles near the core surface, and thereafter increasing the pressure to within the range of about 100 pounds per square inch to 300 pounds per square inch while maintaining the temperature, thereby: (d) compacting the fibers of the core, (e) bonding the fibers together, and (f) bonding the veneer to the core.

8. The method of making a veneer panel with a fibrous ligno-cellulose core and a wood veneer surface, which includes providing a metal support, positioning on this support a layer of green veneer of an angiosperm variety and of a thickness within the general range of $\frac{1}{30}$ to $\frac{1}{100}$ of an inch, said green veneer having thereon a layer of powdered adhesive on the face removed from the metal support, said adhesive being of a type adapted to flow when initially heated, placing on the veneer, in contact with said adhesive, a mass of ligno-cellulose fibrous particles coated with a binder, the particles in contact with the veneer being of a size smaller than 10 mesh and at least 50% of such particles of a size such as to pass a 20 mesh screen, subjecting the above described sandwich initially to a hot plate pressure in the range of 20 pounds per square inch to 100 pounds per square inch for a period of from 15 to 60 seconds and at a temperature sufficient to convert moisture in the veneer to steam and thereby: (a) drying the veneer, (b) plasticizing the adhesive, and (c) forcing adhesive between the core particles near the core surface, and thereafter increasing the pressure to within the range of about 100 pounds per square inch to 300 pounds per square inch while maintaining the temperature, thereby: (d) compacting the fibers of the core, (e) bonding the fibers together, and (f) bonding the veneer to the core while maintaining such higher pressure for a period of the order of one to twelve minutes.

9. The method of making a veneer panel with a fibrous ligno-cellulose core and a wood veneer surface, which includes providing a metal support, positioning on this support a layer of green veneer of an angiosperm variety and of a thickness within the general range of $\frac{1}{30}$ to $\frac{1}{100}$ of an inch, said green veneer having thereon a layer of powdered adhesive on the face removed from the metal support, said adhesive being of a type adapted to flow when initially heated, placing on the veneer, in contact with said adhesive, a mass of ligno-cellulose fibrous particles coated with a binder, the particles in contact with the veneer being of a size smaller than 10 mesh and at least 50% of such particles of a size such as to pass a 20 mesh screen, placing against the opposite side of said mass of ligno-cellulose fibrous particles a second layer of green hardwood veneer of a porous variety and of a thickness within the general range of $\frac{1}{30}$ to $\frac{1}{100}$ of an inch, with a layer of powdered adhesive between the second layer of wood veneer and the mass, subjecting the above described sandwich initially to a hot plate pressure in the range of 20 pounds per square inch to 100 pounds per square inch and at a temperature sufficient to convert moisture in the veneer to steam, thereby (a) drying the veneer, (b) plasticizing the adhesive, and (c) forcing adhesive between the core particles near the core surface; and thereafter increasing the pressure to within the range of about 100 pounds per square inch to 300 pounds per square inch while maintaining the temperature, thereby: (d) compacting the fibers of the core, (e) bonding the fibers together, and (f) bonding the veneer to the core.

10. The method of claim 9, in which the adhesive is applied to the upper surface of the second layer of green veneer and the veneer is thereafter turned over and placed upon the upper surface of the mass of fibrous particles.

11. The method of claim 9, in which the mass of ligno-cellulose particles is precompressed into a core mat before it is placed on the green veneer.

References Cited in the file of this patent

UNITED STATES PATENTS

| | | |
|---|---|---|
| 1,851,952 | Dike | Mar. 29, 1932 |
| 2,419,614 | Welch | Apr. 29, 1947 |
| 2,601,349 | Welch | June 24, 1952 |
| 2,658,847 | MacDonald | Nov. 10, 1953 |
| 2,720,478 | Hogg | Oct. 11, 1955 |